United States Patent [19]

Curles

[11] Patent Number: 4,702,403
[45] Date of Patent: Oct. 27, 1987

[54] RAIL BREAKER

[75] Inventor: Curtis T. Curles, Cordele, Ga.

[73] Assignee: Harris Press & Shear, Inc., Cordele, Ga.

[21] Appl. No.: 606,128

[22] Filed: May 2, 1984

[51] Int. Cl.$^4$ .......................... B26F 3/00; B23P 17/02
[52] U.S. Cl. ................................ 225/96.5; 198/463.4; 198/750; 225/2; 225/103; 414/748
[58] Field of Search .................. 225/96.5, 2, 103–105; 198/463.4, 530–533, 750; 414/748; 83/261

[56] References Cited

U.S. PATENT DOCUMENTS

| | | | |
|---|---|---|---|
| 1,284,312 | 11/1918 | Glover | 225/103 OR |
| 2,613,739 | 10/1952 | Lefere | 83/261 OR |
| 2,826,251 | 3/1958 | Hopkins | 83/261 |
| 3,152,499 | 10/1964 | Moelbert | 225/103 X |
| 3,186,332 | 6/1965 | Long et al. | 198/463.4 X |
| 3,618,741 | 11/1971 | Berndt | 414/748 X |
| 3,700,116 | 10/1972 | Rysti | 414/748 QR |
| 4,239,436 | 12/1980 | Wildenaur | 198/750 X |
| 4,346,828 | 8/1982 | Crawley | 225/103 X |
| 4,522,323 | 6/1985 | La Bounty | 225/2 OR |
| 4,552,291 | 11/1985 | Schott | 225/96.5 OR |

Primary Examiner—Frank T. Yost
Attorney, Agent, or Firm—Cushman, Darby & Cushman

[57] ABSTRACT

A shearing apparatus for breaking railroad type rails into small segments with a standard rail section including a base formed from a bottom flange on each side of the head connecting web. The apparatus includes a sequential rail feed mechanism comprised of an inclined vibratable supply table, a driven conveyor and means to move rails from the supply table to the conveyor. The rails are conveyed to an advancing mechanism located adjacent the breaker head assembly. Predetermined lengths of the conveyed rails are fed into the breaker head assembly where the rail is initially clamped. Following clamping, one bottom flange, on one side of the web, is sheared through and the rail is then contacted by a breaker head positioned beyond the shear plane established by the sheared flange. As the breaker head contacts the rail and bends it outwardly away from the sheared flange until it causes the rail to fail in combined shear and bending, the rail segments are ejected from the apparatus and collected for subsequent handling.

20 Claims, 17 Drawing Figures

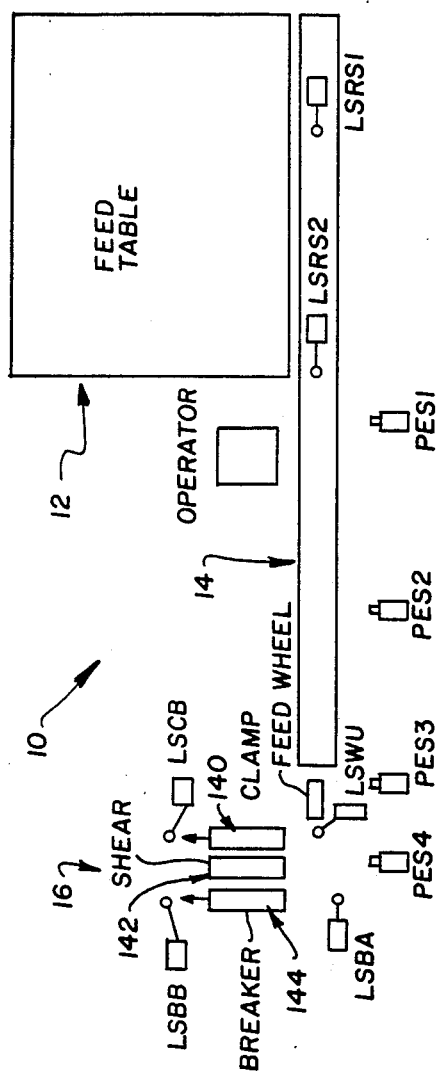
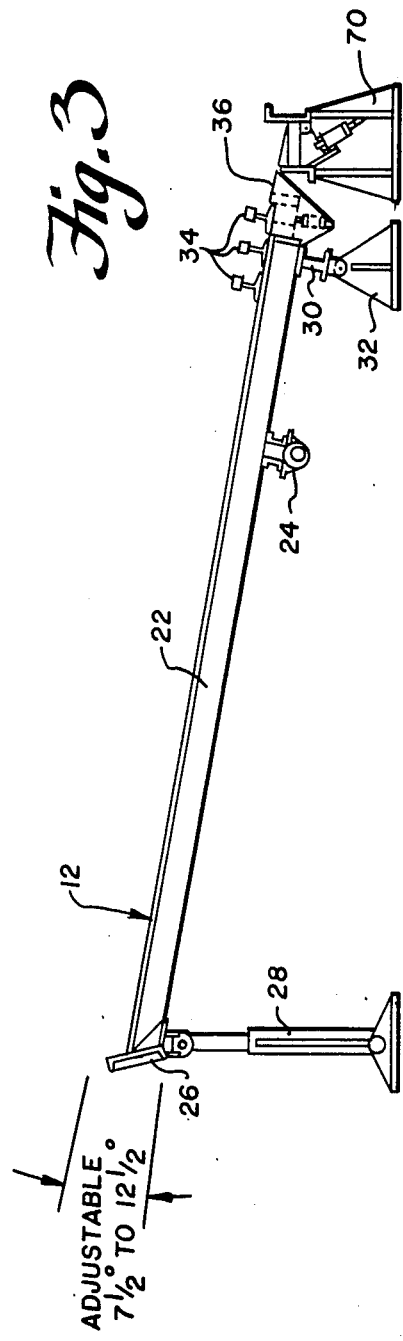

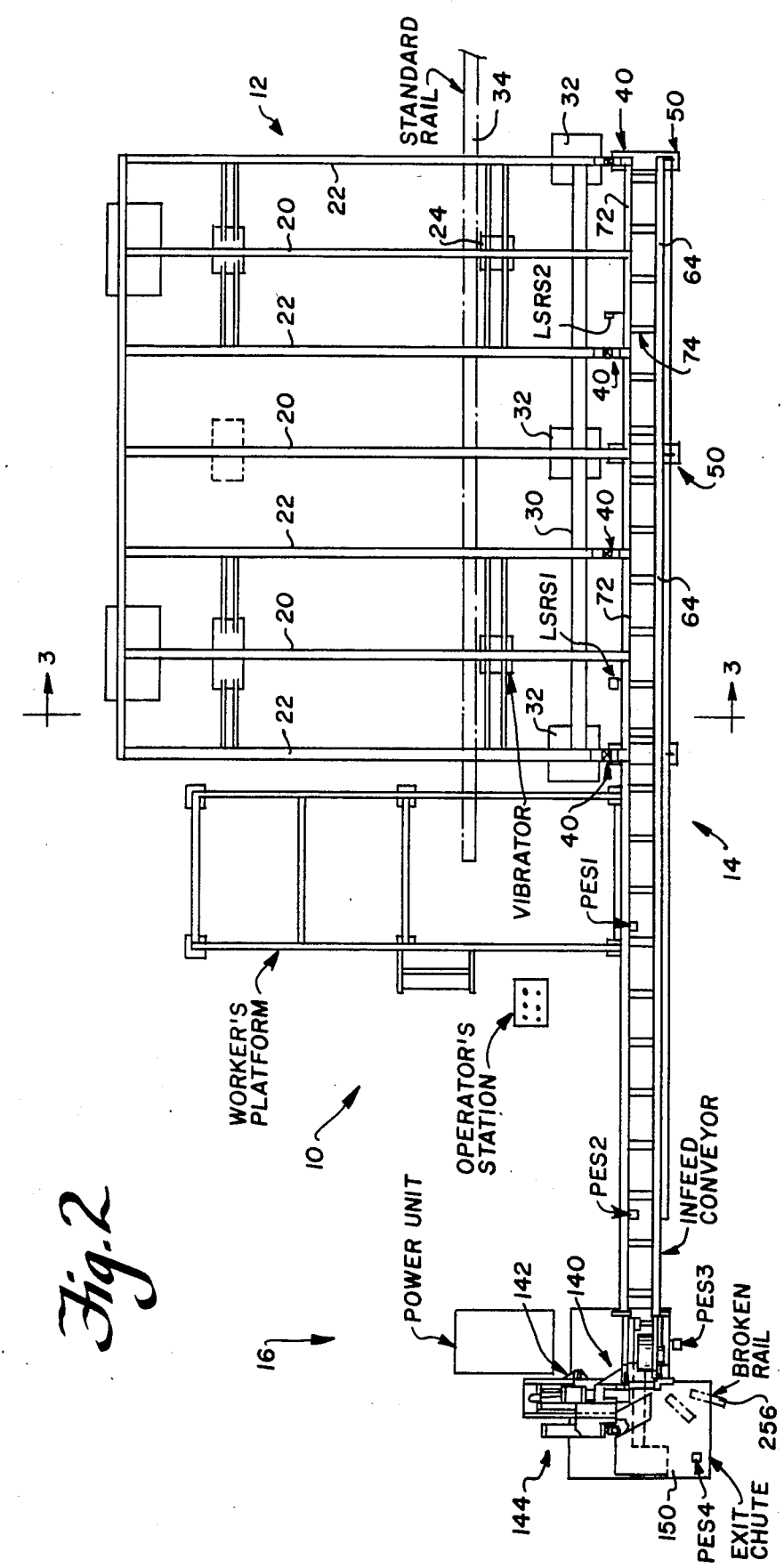

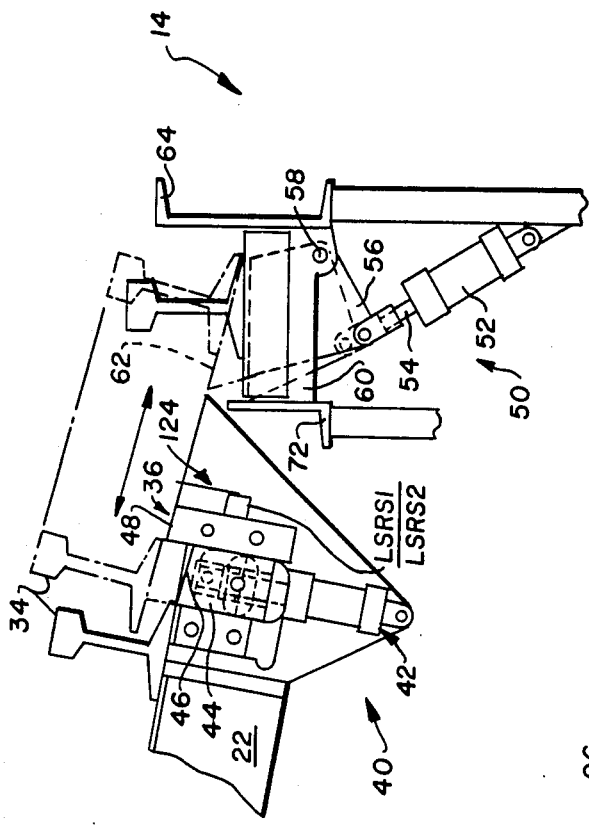
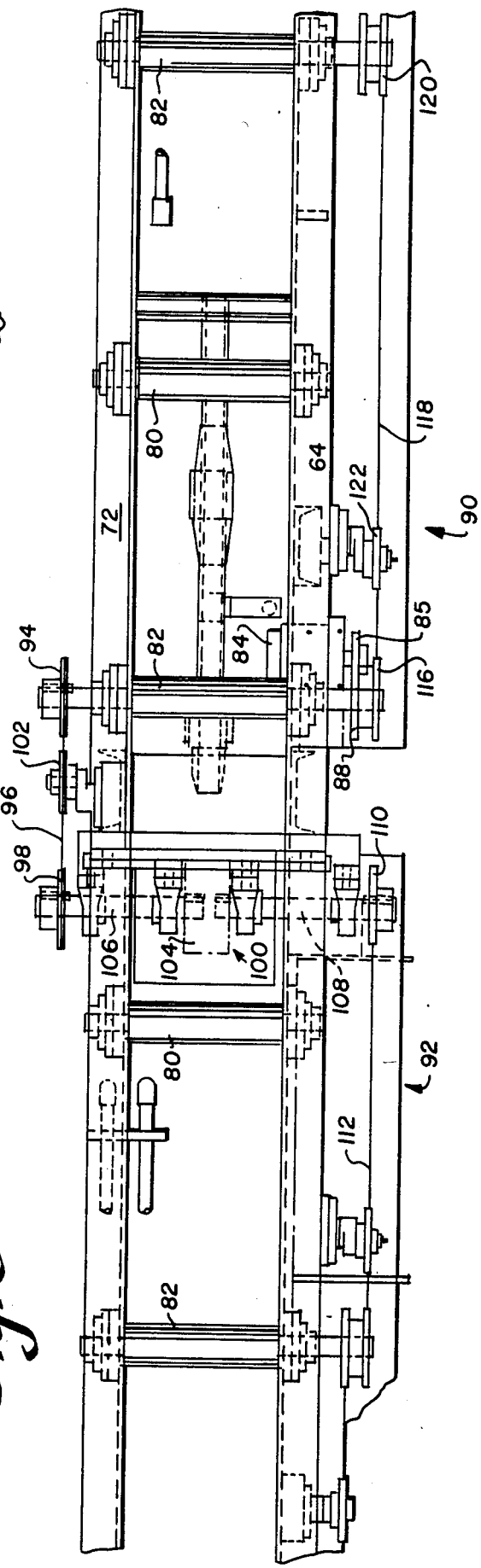

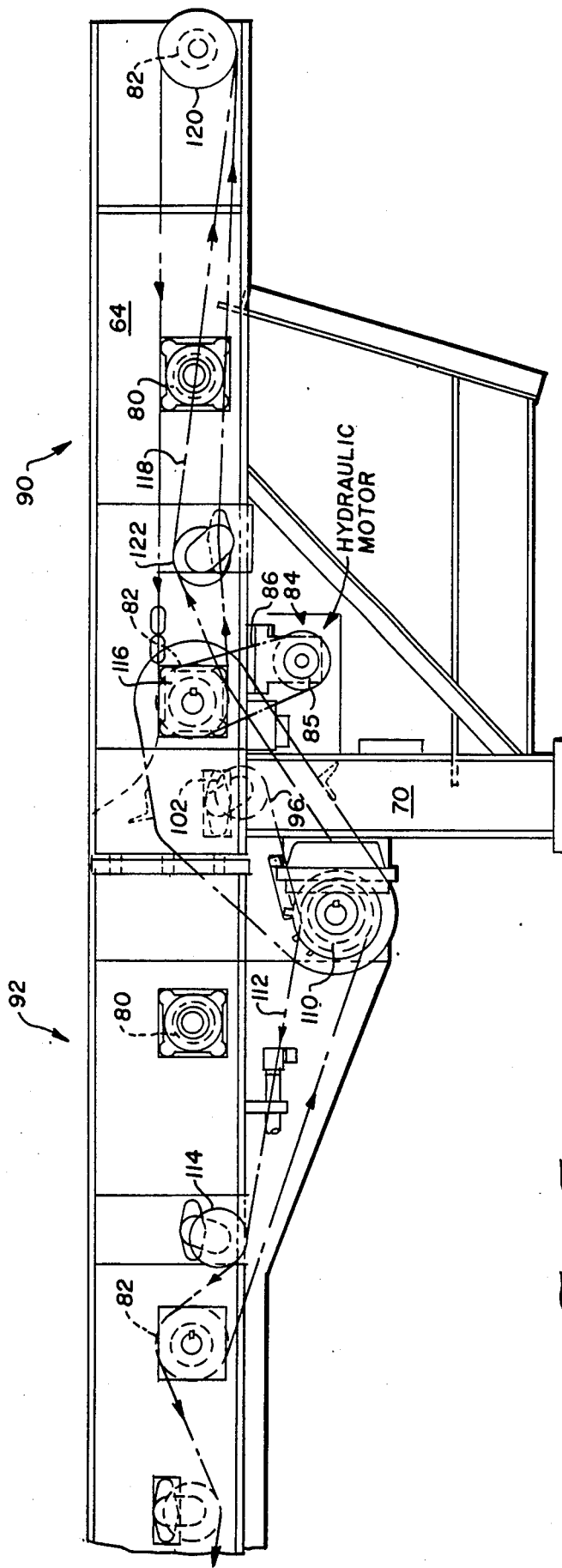

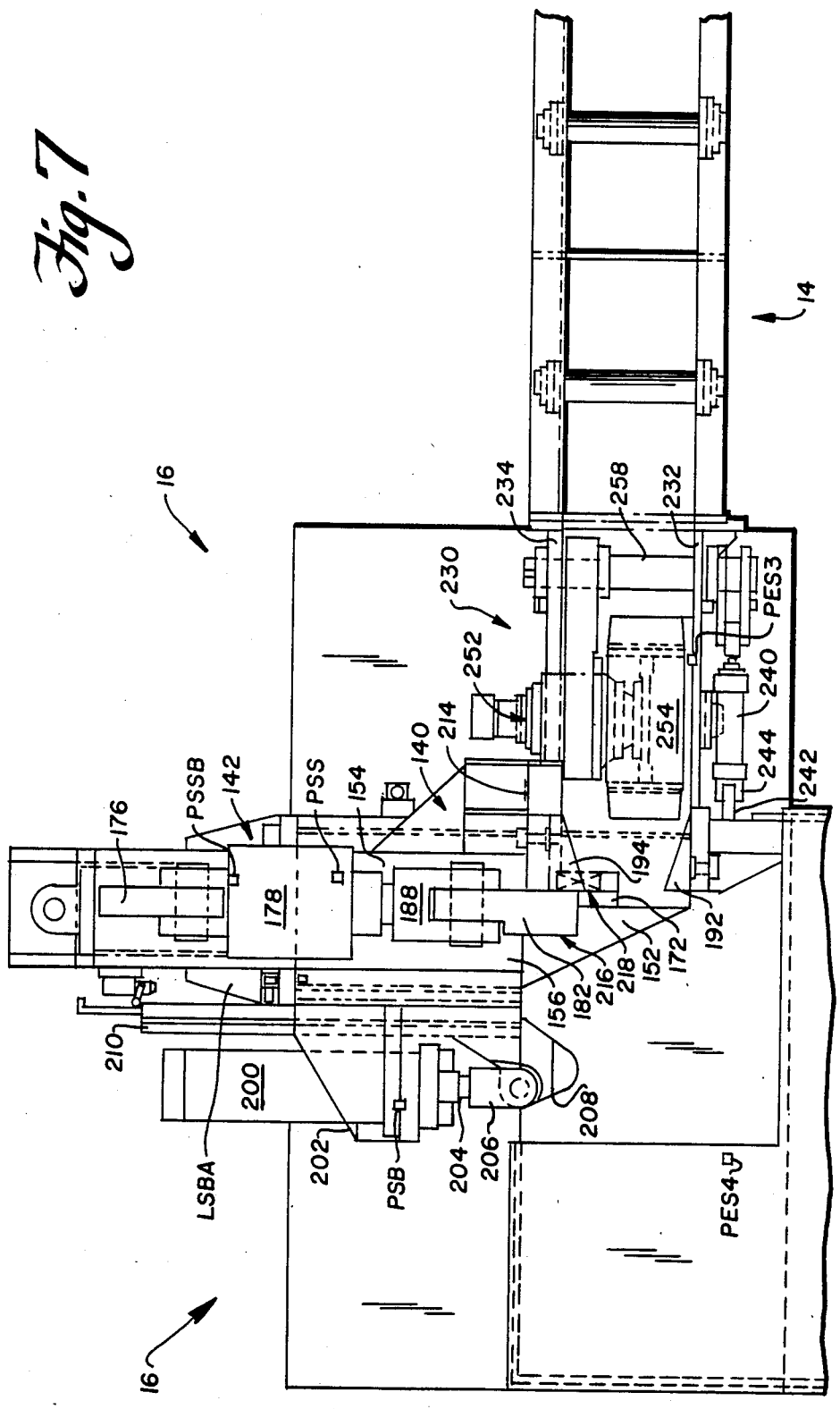

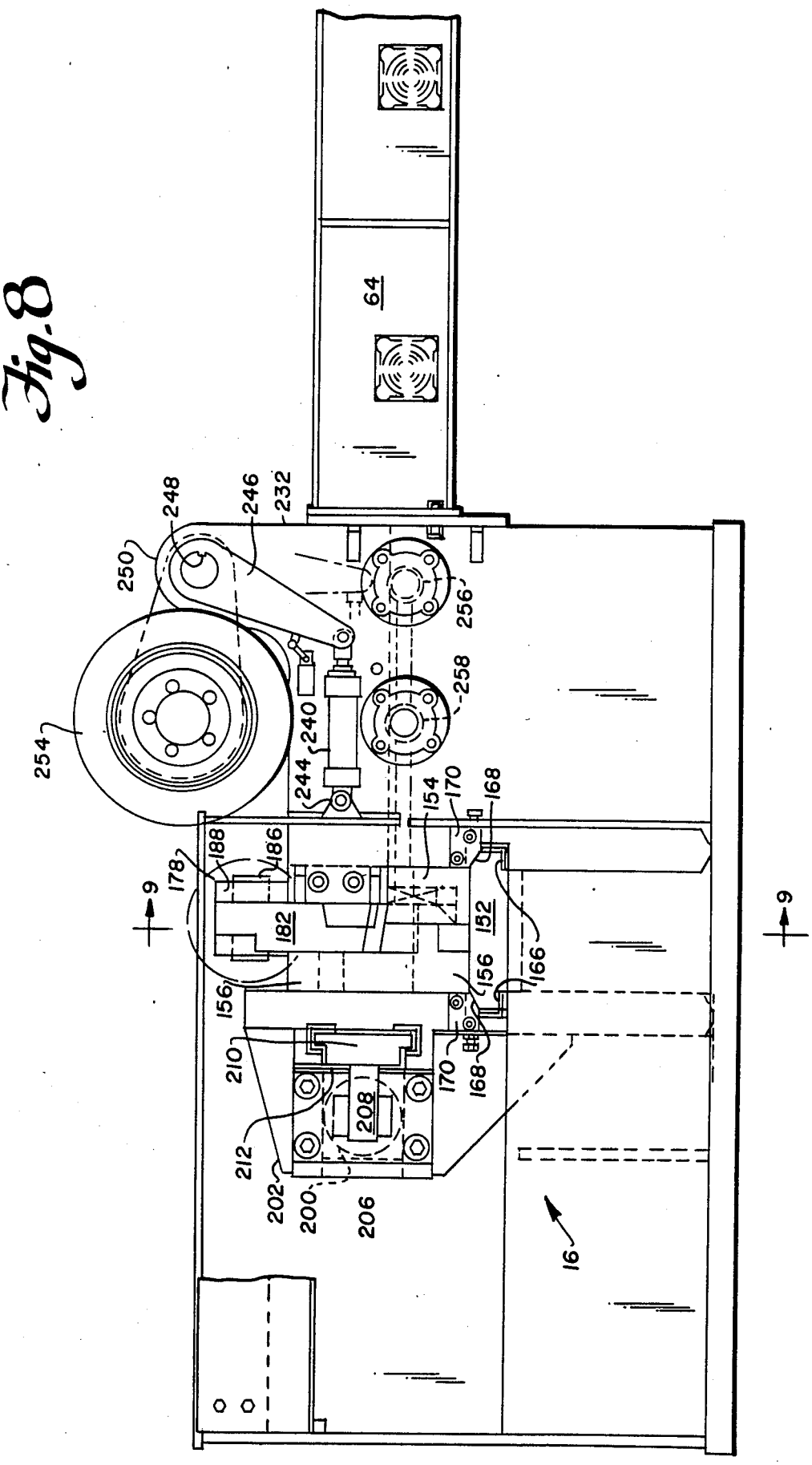

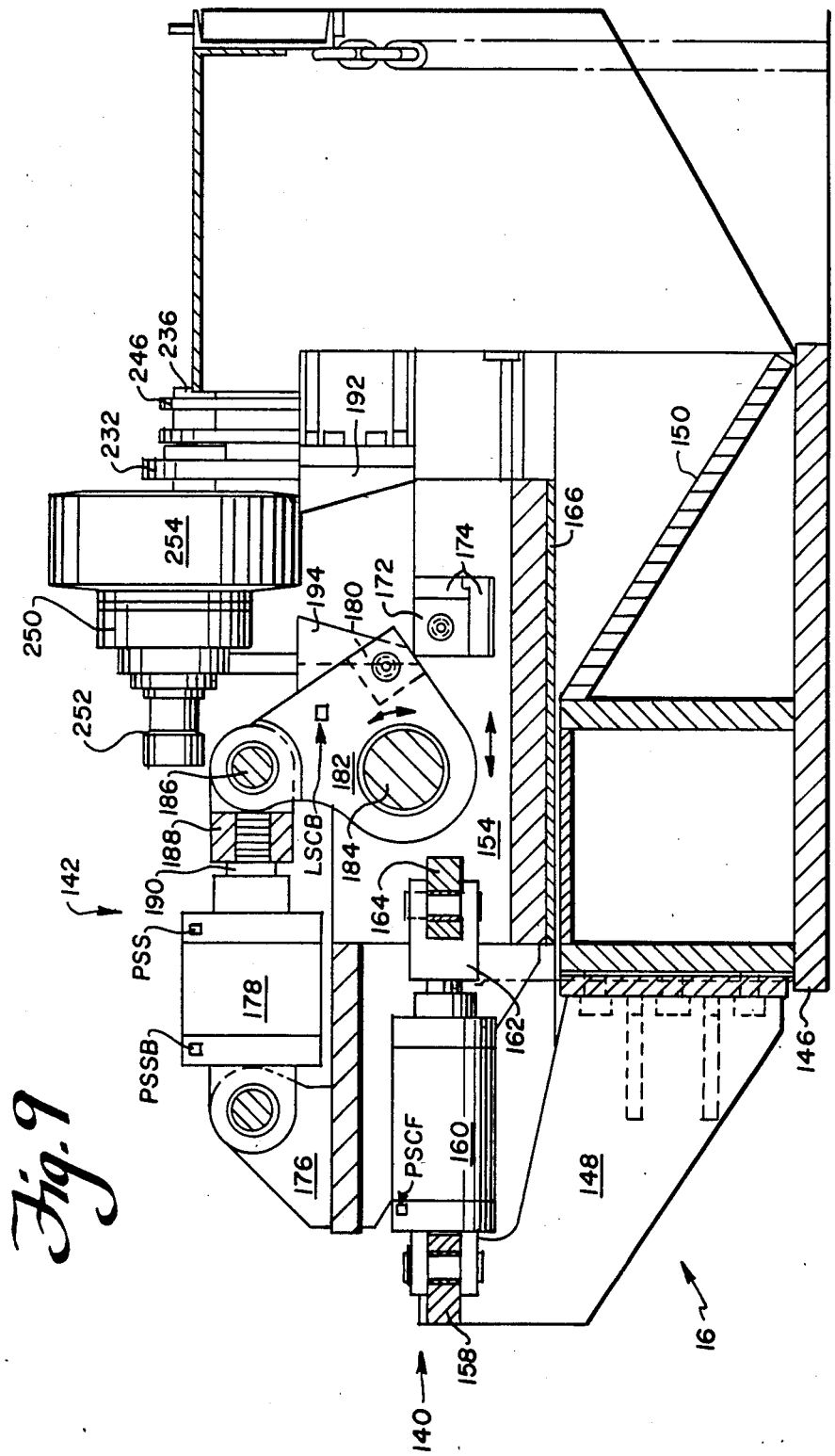

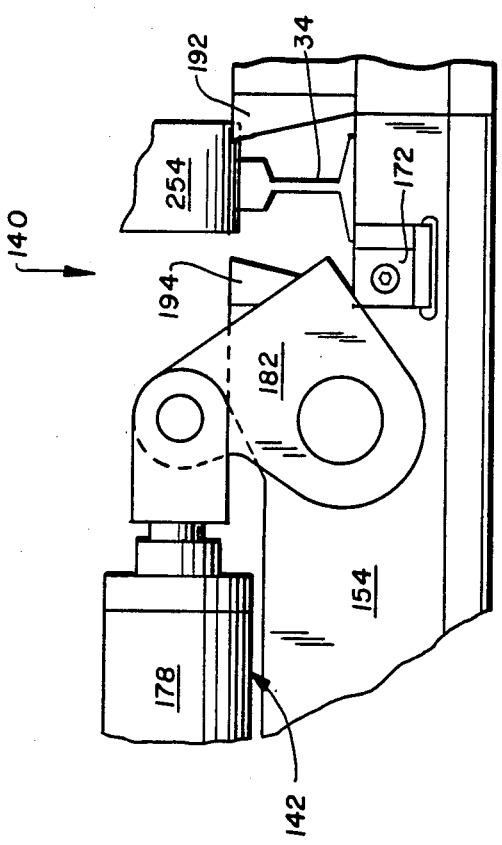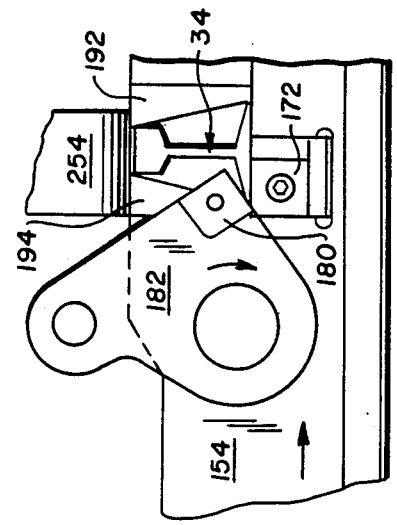

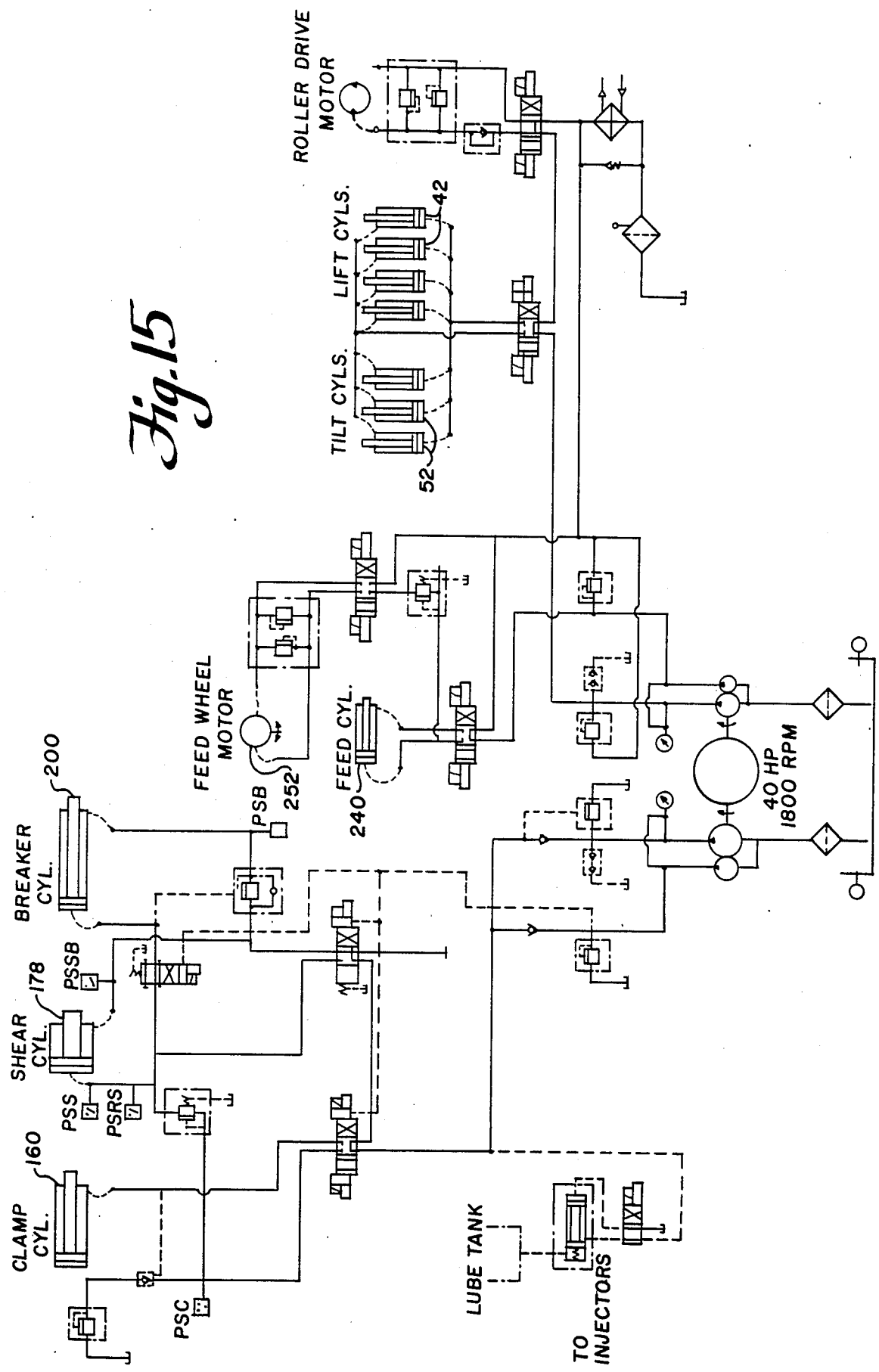

4,702,403

RAIL BREAKER

FIELD OF THE INVENTION

The present invention relates to manually or automatically operated railroad track rail shearing equipment used to break long rail lengths into small, easily handable portions

BACKGROUND OF THE PRESENT INVENTION

For many years, attempts have been made to produce apparatus that would successfully break apart rails or metal bars and in particular railroad track rails. Such rails have a particular cross-section, generally referred to in the industry as a standard rail section, comprised of a head or ball area, a flanged bottom, and an interconnecting web with each of those portions being integrally formed.

Rails that have been taken up from old rail beds need to be broken into small segments to make them more conveniently reprocessable as scrap iron and many attempts at this have been suggested. It would be most desirable if a way could be found to allow this rail breaking operation to proceed in a continuous and automatic manner, and in as simple a manner as possible so that processing can continue in an uninterrupted manner, without operational failures and simply to reduce maintenance and the chance of mechanical failures.

The closest patent that the applicant is aware of is Crawley, U.S. Pat. No. 4,346,828, which deals with a railroad rail fragmenting apparatus and method.

Rails can be placed on loading tables with the tables being raised from a horizontal position to a raised, inclined position which causes the rails to slide toward a conveyor system at the bottom of the inclined table. The rails are transferred one at a time by being rolled over an abutment which allow many rails to initially come to rest on the conveyor in something other than an upright condition. Those that are tipped over are returned to an upright position, resting on the bottom flange, by a hook system so that the rails wind up on the conveyors in an upright fashion. The rail is then conveyed toward a notching station where chisel members, in the form of triangularly shaped heads on the end of a cylinder drive rod, are forceably inserted laterally against each base flange of the rail. This will form notches on each side of the bottom flange. After notching, the rail is fed between a pair of rotating guide members, in the form of pneumatic tires, which feed the notched rail into a breaking station. The notched area of the rail is initially clamped against a fixed wall so that the pair of notches is positioned just beyond the end of that fixed wall which will function as the breaking edge. The portion of the rail which extends beyond that fixed wall will be broken off by a plunger and cylinder which actuates a ram horizontally against the flange of the rail section. The breaking force is applied adjacent the free end of the rail section to be broken and is thus spaced down stream from the fixed breaking edge. It is indicated that fragmentation of the segment of the rail being broken will occur when that extended portion has been bent sufficiently to cause a fracture to develop at the pair of opposite notches which will then extend up and across the remaining portions of the rail section. Clean breaks and continuous operation are not believed to be produceable with Crawley's apparatus. Notching is not always precise, feeding must precisely coordinate with notching locations, rails may not always arrive in upright conditions and there is no suggestion of how to automate the processing operation.

Schrader, U.S. Pat. No. 1,682,633, discloses a manual rail breaker that also indicates that prior to breaking the rail, both opposite sides of the rail are weakened, such as with a chisel or sledge, with breaking thereafter occurring at that weakened position.

Britten, U.S. Pat. No. 303,699, passes rails between a pair of nicking cutters so that the rail is nicked along both sides at four separate places on the web, two adjacent the head, and two adjacent the flange. The flange is then rigidly heldin a slot and the head and web are broken from the flange, then the web is restrained and the head broken therefrom. Breaking is affected by a reciprocating ram adjacent the points where the web had been nicked.

A number of patents disclose the concept of applying force to a rail from one side and resisting that breaking force at two spaced apart locations on the opposite side with breakage of the rail occurring at the point where force is applied from one side. Patents representative of this concept include Heavens et al, U.S. Pat. No. 272,249, Ward et al, U.S. Pat. No. 623,853, Miller et al, U.S. Pat. No. 1,477,582, and Saito et al, U.S. Pat. No. 3,515,326.

Additionally, Glover, U.S. Pat. No. 1,284,312, discloses apparatus for shearing a plurality of metal bars by the joint action of a knife and anvil. Glover indicates that prior to the bars being broken, they are prepared in the usual manner by nicking or scoring with an oxyacetylene torch and then by chilling. Finally, Klempner, U.S. Pat. No. 3,567,089, relates to apparatus for breaking apart engine blocks and uses a ram which comes in contact with one side of an engine block which is supported on the opposite side by two spaced apart supports.

SUMMARY OF THE PRESENT INVENTION

The present invention relates to equipment that can manually or more importantly automatically break railroad track rails in a continuous manner into relatively short sections that can be thereafter more conveniently used as scrap, the short links facilitating the charging of scrap material through furnace openings.

The apparatus is designed to break the rails by a unique failure method which lends itself not only to a high speed approach, but also allows the apparatus to be automatically operated.

While it is preferred to be able to operate this equipment in an automatic mode, manual operation is provided for and will be used for set up and maintenance purposes. Prior to starting the automatic cycle, a first plurality of individual rails will be positioned on an inclined feed table comprised of a plurality of stationary slides and a separate plurality of shaker slides all suitably retained in a support frame. One could, however, employ all shaker slides. The rails are placed across the various slides parallel with the infeed conveyor in an upright position. Vibrators located beneath the shaker slides will be started causing the rails to move down the inclined slides with the bottom most rail coming to rest into a waiting position against a stationary stop. On a command, lifting devices or mechanisms will lift that bottom most rail, directly adjacent the stationary stop, up to the height of the top of that stationary stop. The top of the lifting member is provided with an inclined upper surface, inclined at an angle slightly greater than the angle of the table. That surface will allow the weight of the rail to start the rail sliding along the incline, across the similarly inclined top of the stop member and along an inclined surface of a fixed part of a transfer device. The infeed conveyor is itself equipped with a tilt mechanism which forms the other part of the transfer device. This is movable between lowered and raised positions and when raised into a tilted position, its upper surface will lie in the same plane as the inclined surfaces on the lifting member, the stop and the fixed portion of the transfer device. Thus, when the rails have been lifted by the lifting mechanism above the stationary stops, the rail will slide along the top of that lift mechanism, along the upper surface of the stationary stop the fixed part of the transfer device and onto the tilt mechanism where the rail will come to rest against another stop. The tilt mechanism will then be lowered, placing the rail in an upright condition directly onto the conveyor system, comprised of a plurality of alternating drive and idle rollers. The infeed conveyor itself includes two sections of powered rollers, referred to as front and rear sections, with the front section being operable in tandem with the rear section or disconnected therefrom as needed by means of a clutch. Thus, the front section can be allowed to free wheel or idle while the back section is allowed to continue to be driven and move rails as required to catch up with the rail then being processed on the front section. Suitable switches are used when transferring rails and along the length of the infeed conveyor to provide appropriate feedback signals as necessary in order to both maintain rail movement and feeding from the inclined feed table onto and along the infeed conveyor.

A breaker head assembly is located at the front end of the front section of the infeed conveyor with the breaker head including clamp, shear and breaker assemblies. A separate advancing system comprised of an infeed wheel and suitable switches is positioned upstream from the clamp assembly and will incrementally feed the rail resting on the front conveyor section into the breaker head assembly after each segment is broken from the rail. Photoelectric means will sense rail position and provide part of the signals to control the breaking sequence. When the rail is sensed at a desired position within the breaker head assembly, the incremental advancing system will stop further rail movement and the clamp assembly will be actuated. The clamp is shaped to simultaneously clamp both the ball portion of the rail as well as the support flange.

When the rail has been effectively clamped, the rail will be in its normal upright position. When clamped, one side of the bottom flange will be positioned directly over a bottom knife and a top, pivoting shear, mounted so as to move with the clamping structure, will be positioned directly thereabove. Pivoting of the shear member will shear through a predetermined portion of that single flange with shearing and clamping occurring in substantially the same plane. A downstream breaker assembly, mounted beyond the shear plane, will then be extended to engage the rail and cause the rail to fail in combined shear and bending. Because of the combining of the clamping and shearing the cut produced by the shearing mechanism is efficiently and consistently accomplished. Further, it has been determined that the shearing of one flange provides the most efficient preparation of rails and allow rails to consistently break when contacted by the breaker assembly. In addition, the shearing and breaking functions occur substantially simultaneously thereby achieving an efficient balance between the forces required to achieve shearing and failure to yield consistent breaking of the rails. In addition, the breaker head is designed to use the first clamping cycle, as sensed by photoelectric means, as a reference point for all succeeding breaks on each individual rail. Also, each of the clamp, shear and breaker assemblies back away from the rail between breaks only enough to provide sufficient rail feed clearance, and this drastically reduces the cylinder stroke requirement during each cycle.

Thus, the present apparatus prepares only one side of the flange for fracture by shearing, rather than some other type of penetration or notching and does so substantially simultaneously with the breaking stroke. Not only is a much deeper cut produced, when required, with minimal force, the present apparatus also greatly increases the productivity rate and allows rails to be successfully and sequentially broken apart in an automatic fashion.

Other objects, features, and characteristics of the present invention, as well as the methods and operation and functions of related elements of the structure, and to the combination of parts and economies derived therefrom, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS FIG. 1 is a diagrammatic top, plan view of the apparatus according to the present invention showing the major components of that apparatus as well as the relative positioning of the major sensing devices used to control automatic processing;

FIG. 2 is a more detailed top, plan view of the apparatus according to the present invention;

FIG. 3 is a diagrammatic cross-section of the infeed table taken along line 3—3 in FIG. 2;

FIG. 4 is a side, elevational view of the rail lift and infeds tilt assemblies;

FIG. 5 is a side, elevational view of a portion of the infeed conveyor showing the infeed drive assembly;

FIG. 6 is a top plan view of the apparatus shown in FIG. 5;

FIG. 7 is a top, plan view of the front end of the front section of the infeed conveyor and the breaker head assembly;

FIG. 8 is a front, elevational view of the apparatus shown in FIG. 7;

FIG. 9 is a cross-sectional view of the apparatus shown in FIG. 8 taken along line 9—9 thereof;

FIG. 10 is a diagrammatic, elevational view similar to that of FIG. 9 showing a rail being advanced;

FIG. 11 is a diagrammatic view similar to FIG. 10 showing the rail in its clamped position preparatory to having its one flange sheared by the shearing knives;

Figure 14A:
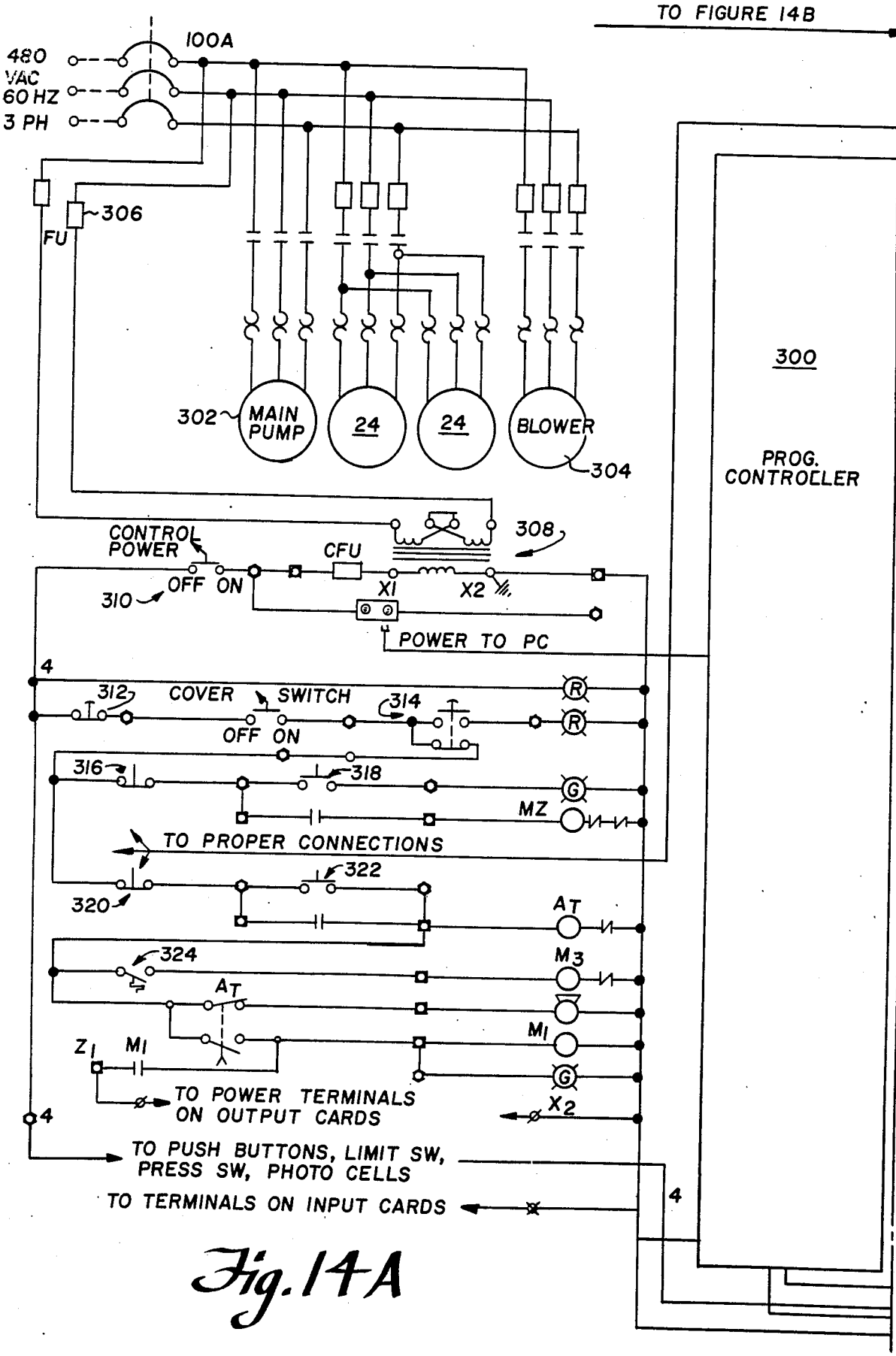
Figure 14:
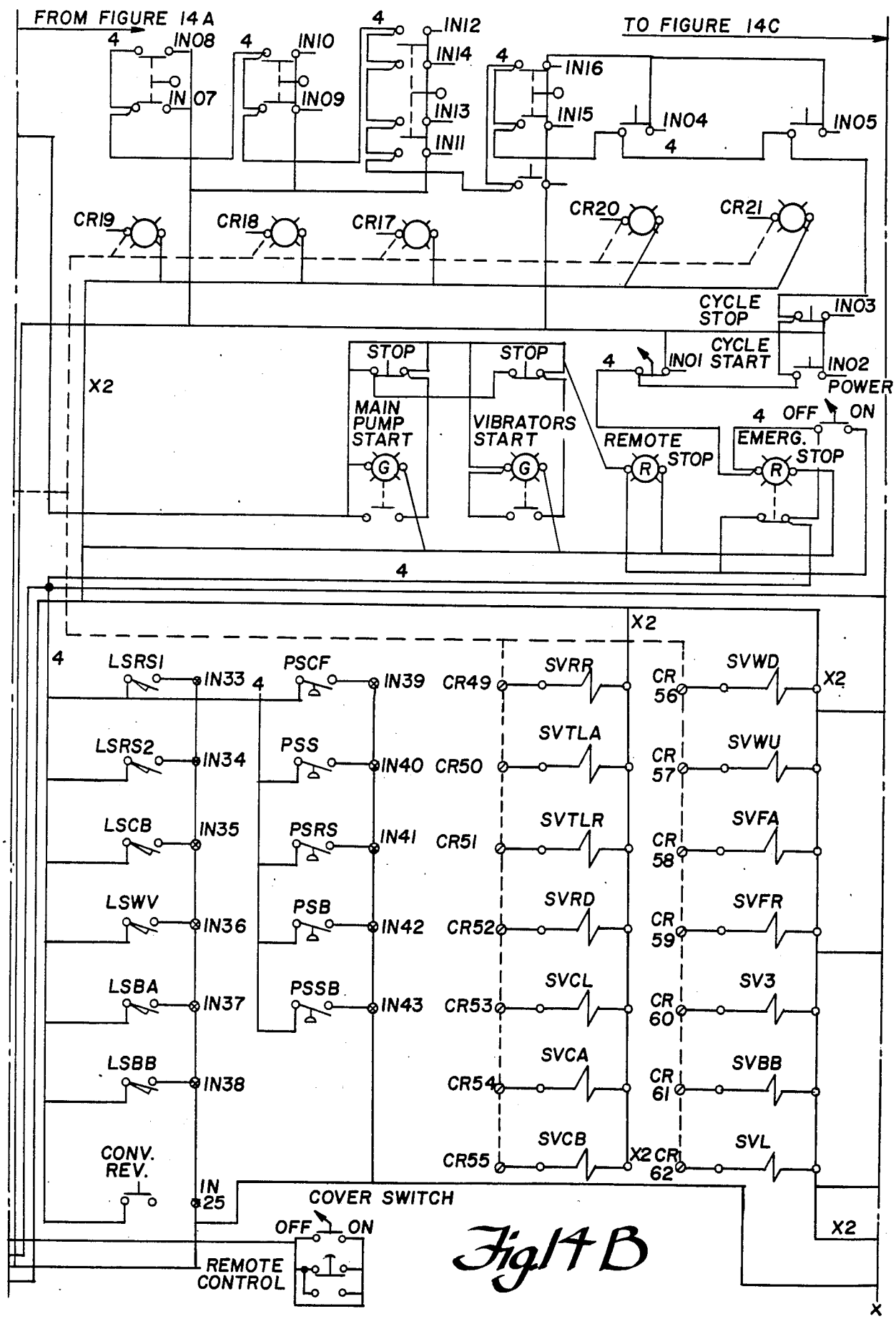
Figure 14C:
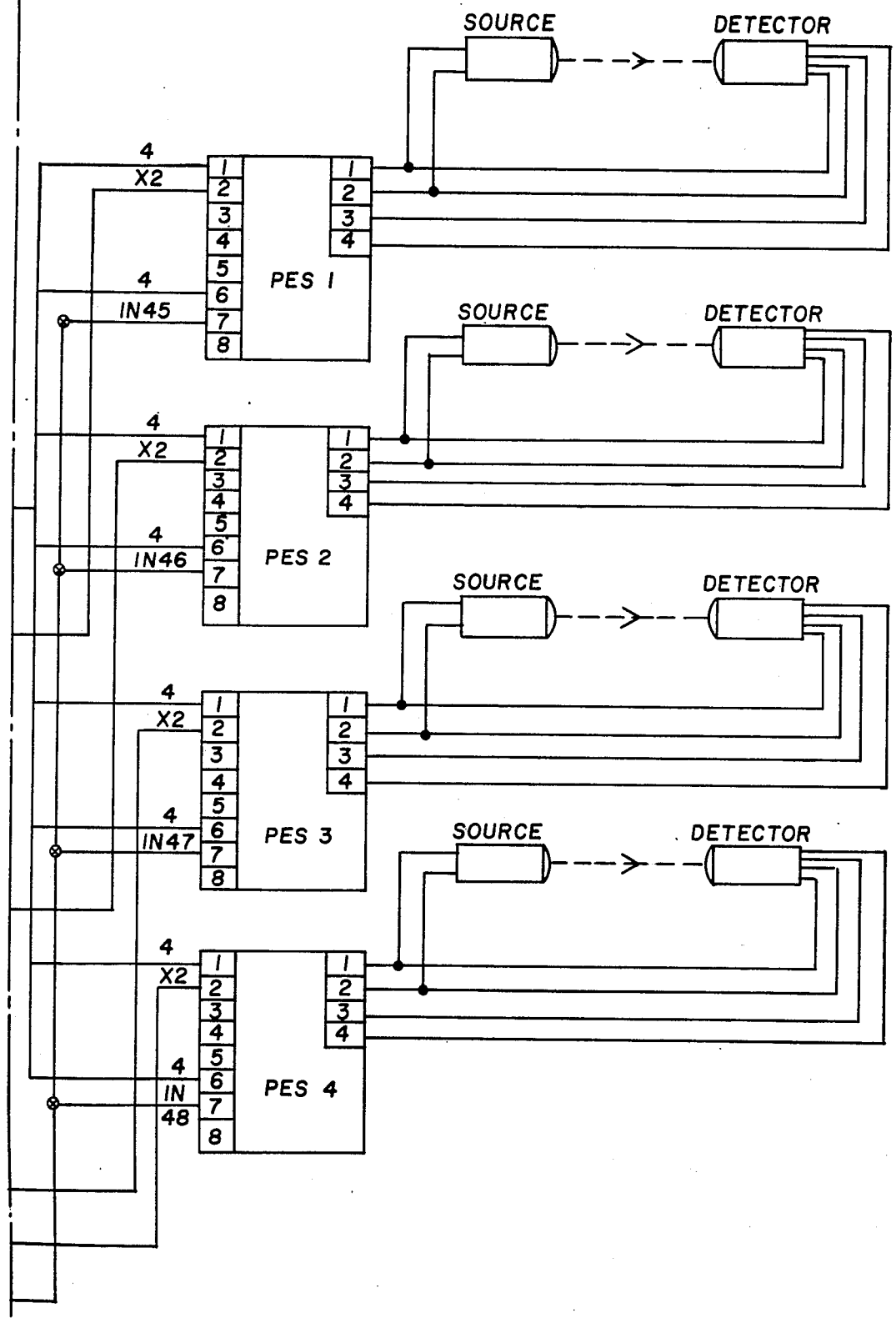

FIGS. 14A, 14B and 14C comprise a series of interconnectable circuit digrams showing the control circuit for the present invention; and FIG. 15 is a diagram of the hydraulic circuit for the present invention.

DETAILED DESCRIPTION OF THE PREFERRED EMBODIMENT OF THE PRESENT INVENTION

Turning now to FIGS. 1–3, the present invention is generally indicated at 10, and is comprised of a feed table assembly 12, an infeed conveyor assembly generally indicated at 14, and a breaker head assembly generally indicated at 16.

The feed table assembly 12 is comprised of a plurality of inclined slides suitably secured to an outer frame, the slides including both stationary slides 20 and shaker slides 22, the latter of which are respectively connected to vibrators 24. The rear or upper end of the feed table is supported by a suitable frame 26 which is in turn supported by members 28 and which allow the table to be adjusted between 5.5 and 12.5 degrees. The front of the feed table is supported to allow for the angle adjustment by a frame element 30 and suitable supports as are shown at 32. It should be noted that each of the slide members could be vibrated, if desired, rather than having selected ones vibrated as shown with the use of additional vibrators, as indicated in phantom, in FIG. 2. Further, the slides being vibrated preferably are mounted via air cushion pads (not shown) in order to isolate vibration from the table.

As shown in FIGS. 2, 3 and 4, a plurality of standard thirty-nine foot railroad rails 34 are supported on the inclined feed table 12 and by the combination of the angle of the feed table and the action of vibrators 24, working on the shaker slides, rails 34 will be continually moved down the incline toward a stationary stop 36 located at the bottom end of the feed table. This should be a heavy duty, replacable stop, as shown in FIG. 4, as a fair amount of wear may be involved in its continuous use.

Four lift mechanisms, generally indicated at 40, are provided at the lower end of the feed table and at the end of the slide with which each is associated. As shown in FIG. 2, these can be, for example, located at the lower end of shaker rails 22. Lift mechanisms 40 are comprised of a lift cylinder 42, such as model no. 2H manufactured by Parker Hannifin, mounted on the upstream side of stop 36 together with a lifting ram 44 which itself has an inclined upper surface 46 that has a width less than the width of the smallest flanged rail so that the next upstream rail will not be contacted when ram 44 is raised. Stop 36 also has an inclined upper surface 48 and as cylinders 42 are energized and rams 44 raised, the rail resting on ram 44 will be raised as shown in phantom lines in FIG. 4. When ram 44 is raised to its full height, surfaces 46 and 48 will be aligned and the raised rail 34 can slide toward the infeed conveyor. Preferably, inclined surface 46 has a steeper angle than the inclined feed table 12 so that the rail, after lifting, is accelerated. The angle of surface 46 can be about 5° more than the angle of table 12. Further, when ram 44 is at its full height, the rail being lifted will not be raised high enough for its flange to engage the ball portion of the next upstream or following rail. This will help assure that the following rail will not be tipped backwards. The desired lifted position for a rail is shown in phantom in FIG. 4.

Located on the infeed conveyor are a plurality of tilt mechanisms 50 each of which are comprised of a tilt capacity cylinder 52 such as model no. 2H, manufactured by Parker Hannifin, suitably mounted to the infeed conveyor 12, with its drive rod 54 being suitably connected to a lift plate 56, pivotally connected to the infeed conveyor structure as shown at 58. When lift plate 56 is in its raised condition, as shown in phantom in FIG. 4, its upper surface 62 will be aligned with surfaces 46 and 48 so that the raised rail can slide first along surface 46, then across surface 48, along stop 36 and then along surface 62 of lift plates 56. A stop member 64 which can either be a channel member extending along the length of the infeed conveyor 14 or provided at least at appropriate intervals along the exterior edge of infeed conveyor 14 in order to stop the sliding movement of rails 34. When the rail has arrived as shown in phantom on surface 62, cylinders 52 can be actuated to lower lift plates 56 which positions rail 34 as shown in full line on the infeed conveyor and thus ready to be moved along.

Infeed conveyor 14 is itself supported by supports 70, as in FIG. 3, as well as two channel supports 72, as shown in FIG. 4, and a channel member 64 that also serves as a stop for rails 34. A plurality of rollers, generally indicated at 74 in FIG. 2, are suitably positioned at spaced apart intervals between members 64 and 72 along the length of the conveyor and it is those rollers that rail 34 is positioned when the lifting plates 56 are retracted, as shown in full line in FIG. 4.

With reference now to FIGS. 5 and 6, rollers 74 are comprised of idle rollers 80 and driven rollers 82. Idle rollers 80 are preferably about ⅛" smaller in diameter to allow the rail to rest only on drive rollers 82 thereby increasing driving efficiency. Infeed conveyor 14 has a main hydraulic drive motor 84 with a suitable displacement to move the rails at a desired speed and can be model 1031299, manufactured by Char-Lynn, a division of Eaton Fluid Power Products. Motor 84 is connected by its drive sprocket 85 operating through a suitable drive chain 86 to a set of drive sprockets 88 on one side of one of the drive rollers 82 which is positioned at the head of the second section of the infeed conveyor, generally indicated in FIGS. 5 and 6 at 90. The front section of the infeed conveyor is generally indicated at 92 in those FIGURES. A drive sprocket 94 is positioned on the other side of the main drive roller 82 from where drive sprocket 88 was connected to motor 84 with sprocket 84 being connected by a suitable drive chain 96 to sprocket 98 on one side of a clutch assembly generally indicated at 100. As desired, a tensioning device 102 can also be used with respect to chain 96 in order to maintain proper tension on chain 96 relative to the sprockets it is driving.

Collector assembly 100 is comprised of an electric clutch coupling 104 to which two operating shafts, respectfully shown at 106 and 108, are connected. Shaft 106 is connected to sprocket 98 whereas shaft 108 is connected to a separate drive sprocket 110. Sprocket 110, in turn, provides power to drive chain 112 which powers the forward section drive rollers 82 with use of appropriate chain tensioning mechanisms such as indicated at 114. Thus, clutch 104 provides the control connection between drive shafts 106 and 108 and when they are disconnected, the front section drive rollers 82 will not be driven, but in an idle condition. Notwithstanding the connection or not of the front section rollers, the rear drive rollers 82 will still be driven by motor 84 via drive sprocket 116 and chain 118 which operatively connects drive sprocket 116 to drive sprockets 120 of the drive rollers 82 of the rear section.

Chain 118 can also be appropriately tensioned by tensioning mechanism such as shown at 122.

Thus, with respect to the infeed conveyor, it is composed of separately driven rear and front sections, 90 and 92, respectively, with the front section 92 having the ability to be sequenced between idle and driven conditions by clutch 104. Thus, the front section can, in effect, free wheel if a rail 34 is positioned on the front section and is under the control of feed wheel 254, while the rear section 90 can be driven to allow a new incoming rail to catch up with the rail then being processed.

Control over the rails and the generation of control signals responsive to their positioning is first provided by two limit switches, LSRS 1 and LSRS 2, each positioned, as shown in FIG. 4, at spaced apart positions on stationary stop 36. Each switch includes an upstanding sensing finger 124 that will be tripped as a rail 34 slides therepast along surface 48. As shown in FIG. 1, switches LSRS 1 and 2 are shown at opposite sides of the feed table to assure the proper sensing of each end of the rail and that each has properly been transferred from table 12 onto infeed conveyor 14. Additionally, a short rail override switch can be provided to in effect falsify the data normally provided by both LSRS 1 and 2 when a short rail is fed that will not span between both switches. Thus, rails of virtually any length can be processed by this system.

Control over rails 34 also includes a plurality of photoelectric switches PES-1, 2, 3 and 4. Photoelectric switch PES 1 is provided to sense the presence of the front end of a rail 34 when feeding on the infeed conveyor is initiated and also to sense when the rear end of a rail, then being handled, has passed. At that point, the rail feed system described above will again sense when the rail feed mechanism has been actuated with another rail 34 having been transferred from the feed table onto the infeed conveyor and the rear section of the infeed conveyor has been operated to position that new rail for handling and automatic processing.

Photoelectric switch PES 2 is provided in order to also initially sense when the front end of the rail has passed that point. When the front end of the rail passes PES-3, the latter switch will stop further rail advance to allow the clamp mechanism, 140, to initially advance to move the rail to the far side of the feed conveyor and in the breaking head against jaw 192. Then that clamp mechanism will retract just enough to clear the rail and allow that rail to be moved. Feed wheel 254 will then be brought down against the ball of the rail and its operation initiated to advance the rail to the position of PES-4, which is set at the desired cut length. When PES-4 senses the front end of a rail, it too stops further rail advance. Breaker head operation, described below, is then initiated and following breaking, feed wheel 254 will again advance the rail to the PES 4 position. This sequence is repeated automatically and when the trailing end of a rail clears PES-3, feed wheel 254 will raise to clear for the incoming rail. As mentioned above, when the trailing end of a rail clears PES-1, a new rail is fed onto infeed conveyor 14 and the rear conveyor portion will convey the new rail to PES-2, if the rail being processed has cleared PES-2. Finally, when the trailing end of the processed rail clears PES-3, the rear conveyor will advance the next rail up to the PES-3 position beneath feed wheel 254 and the entire sequence is again automatically repeated.

BREAKER HEAD ASSEMBLY

The breaker head assembly, generally indicated at 16 in FIGS. 1 and 2, is shown in detail in FIGS. 7, 8 and 9. The various stages through which that breaker head assembly operates is set forth diagrammatically in FIGS. 10–13.

Breaker head assembly 16 is comprised of three main components including a clamp mechanism 140, a shearing mechanism 142 and a breaker mechanism 144.

The breaker head assembly 16 is mounted on a frame member, generally indicated at 146 in FIG. 9, that will be suitably connected to the infeed and conveyor portions so that together an integral system is constructed. Frame 146 also includes a rear mounting bracket 148 and an angled front wall 150, the latter constituting an exit chute along which the broken segments from the rails can slide toward a collection area.

Clamp mechanism 140 is comprised of a primary slide member which, as shown in FIG. 8, has a generally U-shaped section formed from a base 152 and two upstanding walls 154 and 156. Wall 154 is shown in side elevation in FIG. 9.

Bracket 148 includes a pivotal mounting arm 158 to which the main clamp driving cylinder 160 is attached. The drive arm of cylinder 160 is connected to a clevis 162 itself pivotally secured to a mounting arm 164 welded or otherwise secured to wall 154. Thus, cylinder 160 move the U-shaped slide mechanism of clamp 140 comprised of members 152, 154, and 156 through a back and forth, reciprocating stroke along frame 146 and thus toward and away from the clamping/shearing area. With respect to FIGS. 8 and 9, it should be noticed that the base member 152 slides along rails 166 located on each side of the base member, within frame 146. In addition, the upper surfaces of base member 152 are beveled as at 168 and retaining members 170 maintain the positioning of base member 152 with respect to rails 166 and frame 146.

Mounted at the front of wall 154 is a lower shear knife 172 which is retained in suitable seats 174 by bolts or screws and a mounting arm 176 for mounting the rear portion of the shear clamp cylinder 178 is located on the top rear of wall 154. The upper shear knife 180 is fixed to a rotating shear member 182 pivotally secured about a mounting arm 184 which is retained in wall 154. Shear member 182 has a connection in an upper portion to a clevis 188 by a pin 186 and clevis 188 is, in turn, connected to drive rod 190 of cylinder 178. In order to obtain better control over the amount of penetration of the sheer mechanism toward the rail base, an adjustable shear cylinder mounting clevis can be used to allow changes in the horizontal positioning of that mechanism.

The jaws of clamp mechanism 140 are comprised of two members 192 and 194 with member 192 being fixed to part of the breaking head assembly frame 146 and thus fixed in position. The other jaw member 194 is secured to wall 154 and slides with that wall under the control of clamp cylinder 160. Each of these jaw members 192 and 194 is tapered both in the clamping plane, as shown in FIG. 9, with the upper portion of the members being wider and, as shown in FIG. 7, the jaw members also taper so as to open toward the infeed conveyor 14. These tapered surfaces help guide rails into the clamp and properly clamp both the wider bottom flange and the narrower rail head.

Breaking mechanism 144 includes a breaking control cylinder 200 mounted to an upstanding portion of frame 146 which extends outwardly beyond the slide mechanism of the clamp assembly, with that portion of frame 146 being generally indicated at 202. Drive rod 204 of break cylinder 200 is connected by way of a clevis 206 to a breaking member 208 which includes a slide portion 210 shaped to slide within a complimentary opening or groove 212 provided within frame member 202.

Actuation of clamp cylinder 160 will be more fully described below and movement of clamp mechanism 140 is sensed to its clamped position by a pressure switch PSCF associated with the hose shown from the feed value for cylinder 160 actuated by the pressure rise which occurs on clamping when the rail has been forced over to the stationary side and shown in FIG. 9. This PSCF switch is triggered when the piston within cylinder 160 is in a forward position and has clamped the rail. Thus, any width of rail can be accomodated automatically with most rails having a 4 to 6 inch base. Return of the clamp mechanism 140 to its back or unclamped position is sensed by a limit switch LSCB, shown in FIG. 7, which is tripped by an upstanding wall surface 214 which forms part of the upright support for jaw member 194. Thus, when clamp mechanism 140 is in its full back position, the actuating finger of limit switch LSCB will be actuated.

The shear mechanism 142 has its forward and back positions sensed by a forward pressure switch PSS, shown in FIG. 7, and by a rear pressure switch PSSB, similarly shown in FIG. 7 in dotted line on cylinder 178.

The positioning of the breaking mechanism 144 is sensed by limit switches, one designated LSBB, shown in FIG. 7, for sensing when the slide portion 210 is in its desired retracted position, that is when cylinder 200 has fully retracted drive rod 204 and breaking member 208. The full actuation of the breaker mechanism 144 is sensed by a second limit switch designated LSBA which is actuated when the rear of slide portion 210 is moved past that limit switch when slide portion 210 is moved forward within frame member 202. During operation, LSBB will permit retraction of the clamp only partially, just enough to clear the rail to minimize the clamping stroke and running time.

As explained previously, the preference with this apparatus is to break the rails 34 into 18, 24 or 36 inch segments and in order to accomplish that it is desired to have breaking member 208 positioned approximately 16 inches from the clamping and shearing plane. As can be noted in FIG. 7, the shearing face 216 of shearing head 182 abuts the front face 218 of jaw member 192. Similarly, the cutting face of the lower shear knife 172 is in the same plane as faces 216 and 218. Thus, the shearing and clamping planes are substantially identical.

RAIL ADVANCING MEANS

Located between the end of infeed conveyor 14 and breaker head assembly 16, is a rail advancing mechanism generally indicated at 230 as in FIG. 7. Frame elements 232 and 234 are mounted between the front end of the infeed conveyor 14 and the frame of the breaker assembly 16 with those frame elements serving to pivotally support a bar 236. A positioning cylinder 240 is connected to a support arm 242 by pin 244 with arm 242 being frame 146. Cylinder 240 has a drive arm connected to the lower portion of a crank arm 246 which itself is secured to bar 236 by any convenient means such as key 248. A support arm 250 is connected adjacent the opposite end of bar 236 from crank arm 246 and supports at its outer end a drive motor 252 and a drive or feed wheel 254, the latter being operatively connected to motor 252.

The positioning of crank arm 246 is sensed by limit switch LSWU, shown in FIG. 8 as being positioned on frame member 232. This switch senses when crank arm 246 is in its back position, as shown in full line in FIG. 8, at which point the feed wheel is in its up and disengaged position relative to any rail therebelow. When cylinder 240 is actuated, crank arm 246 will be moved outwardly into the position as shown in phantom in FIG. 8 which lowers feed wheel 254 into engagement with the top of a rail therebelow. This movement of arm 246 is sensed by switch LSWU.

Motor 252, preferably is a hydraulic motor, such as model 103-1020, manufactured by Char-Lynn, that can operate feed wheel 254 through suitable gear reduction means to permit the positive starting and stopping of the rail thereunder.

Feed wheel 254 provides an efficient way to index a rail 34 into the breaking head area to produce the desired 18, 24 and 36 inch segments. Once the rail is within the grip of feed wheel 254, and while still resting on rollers 256 and 258 therebelow, the rail will not be free to hang up or slip, but rather will be fed smoothly and cleanly through the tapered jaws and pass the clamping plane. Thus, the combined effects of the tapered jaws 192 and 194 together with feed wheel 254 and rollers 256 and 258 virtually eliminates any manual assistance that would otherwise be required to feed the rails.

Feed wheel 254 is preferably a solid, rubber wheel or tire that can be mounted on a hub although any type of feed wheel mechanism could be employed.

The clamping jaws 192 and 194 are preferably formed from hardened knife steel and are shaped to firmly capture both the head or ball portions of the rail as well as the wider bottom support flange. The jaw openings are wide enough to accept a wide variety of rail sizes and preferably can open from 3 ½ to 12 inches.

With reference to FIGS. 10-13, the sequence of operation with respect to the clamping, shearing and breaking mechanisms can be followed.

Turning first to FIG. 10, the clamping assembly 140 and the shearing assembly 142 are both withdrawn with jaws 192 and 194 being at their widest open position. Feed wheel 254 is in engagement with the ball or head portion of rail 34 and rail 34 can be fed through the passageway between jaws 192 and 194 to a position where its outer end is sensed by photoelectric switch PES 4 at which point further operation of feed wheel 254 is halted.

Figure 12:
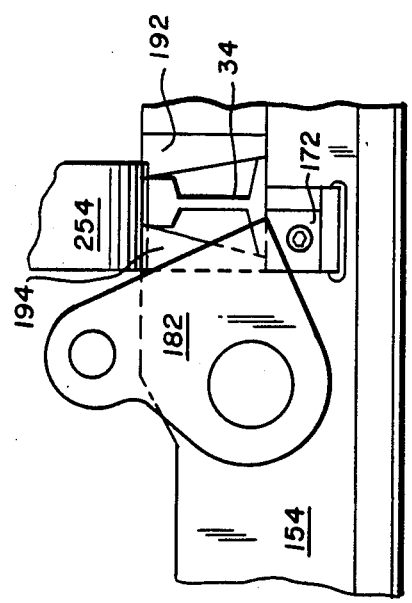
FIG. 12 is a diagrammatic view of the apparatus following shearing.

As shown in FIG. 11, jaws 192 and 194 are closed by the activation of clamping cylinder 160 which moves wall member 154 to the right as shown by the arrow. This causes jaw member 194 to engage both the bottom flange of rail 34 as well as the ball portion thereof and push rail 34 back against jaw member 192 where it is similarly engaged. Likewise, and simultaneously with the movement of wall 154, the lower knife 172 and the upper knife 180 are postioned about one of the bottom flanges of rail 34. When shear cylinder 178 is actuated, shearing head 182 is rotated as indicated by the arrow, forcing the upper knife 180 through a major portion of the rail flange as shown in FIG. 12.

Figure 13:
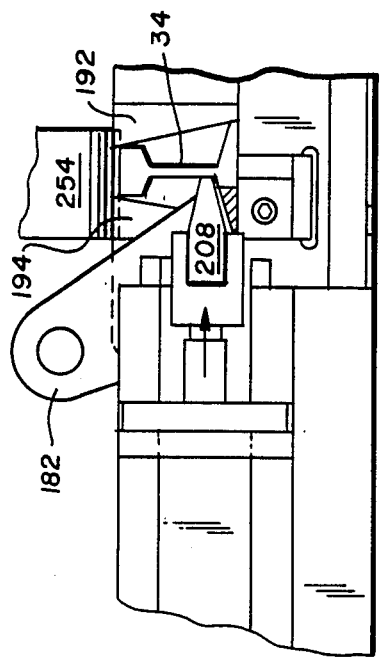
FIG. 13 is a diagrammatic view of the apparatus at the point where the breaking ram is engaging the sheared rail section.

Substantially, simultaneously with the activation of shear cylinder 178 and the shearing of the flange, cylinder 200 is activated causing the breaker member 208 to move outwardly against rail 34 as shown in FIG. 13 so that in conjunction with the shearing effort, the breaking head 208 will break the rail at the shear and clamping plane established by clamping jaw members 192 and 194.

With reference to FIG. 2, once the broken rail segment, indicated at 256 will slide down the exit chute 150 for collection.

CONTROL CIRCUITS

Electric Circuit

Turning now to FIGS. 14A, B and C, the control circuit for the shearing and breaking apparatus is set forth. It should be understood that the basic portion of the control functions governing the automatic operation of the apparatus is provided by a Westinghouse programmable controller PC1100. Attached to this application is the Numa-Logic Ladder printout for the program as well as the wiring diagram for the PC controller with these corresponding to the box indicated at 300 on FIG. 14A for that programmable controller.

With reference to FIG. 14A, a 480 VAC60 Hertz 3-phase current is supplied and the main pump 302, vibrators 24 and the main blower 304 are directly connected to this power source. Through suitable fuses 306 and a transformer 308, power is supplied to the rest of the circuit with primary on-off control being provided through a main power control switch 310. An emergency stop switch is also provided at 312 as well as a remote lock out switch 314 so that the device can be remotely stopped if required. Start/stop switches, respectively indicated at 316 and 318, are supplied to control vibrators 24 and similar start/stop switches, respectively indicated at 320 and 322, are provided to control the start-up alarm relay system. Blower 304 is preferably actuated by thermostatically operated switch 324 which closes upon a preselected rise in temperature.

With reference to the top portion of FIG. 14B, inputs 7 and 8, respectively, relate to inputs associated with the clamp assembly being forward or retracted. Input 9 is generated when the shear and breaker assemblies are retracted whereas input 10 relates to the shear assembly being in its retracted position.

When feed wheel 254 is in its up position, input 11 is generated, whereas input 12 will be generated when the feed wheel is down in contact with the rail. When the feed wheel is advancing a rail, input 13 will be generated and retraction of the feed mechanism will generate input 14.

With respect to inputs 15 and 16, these are generated when the lift and tilt mechanism is its advanced position or when retracted, respectively. Input 1 will be generated when the cycle is in its automatic mode and cycle start and cycle stop conditions generate inputs 2 and 3, respectively. Inputs 4 and 5 relate to the conveyor being forward or reversed. In addition, the emergency and remote stop push buttons are shown as well as the start/stop buttons for the vibrators and the main pump.

The lower portion in FIG. 14B shows the source of inputs IN33–IN43 as well as outputs CR49–CR62 and reference can be given to the attached sheets showing the controller external connections and the PC rack wiring diagram. The identification of the labeled switches and solenoid valves is contained in the external connection drawing within the attachments and will not be repeated here.

With respect to drawing 14C, the circuits for the four photoelectric switches PES1–PES4 are shown with these respectively producing inputs IN45–IN48.

Drawings 14A, B and C, together with the attachments to this application relating to the Numa logic and the other circuit connection sheets, are deemed to be sufficient to provide one skilled in the art with a sufficient understanding of exactly how the control system for this device is arranged in order to provide the automatic sequencing as described. Accordingly, further description is not deemed to be required.

Hydraulic Circuit

With reference to FIG. 15, the hydraulic circuit for the present apparatus is set forth. On that circuit, the clamp cylinder 160, shear cylinder 170, and breaker cylinder 200, together with the feed control cylinder 240, the roller drive motor 84, the feed wheel motor 252, lift cylinders 42 and tilt cylinders 52 are all set forth together with the hydraulic circuits necessary to control their operation. It is believed that this hydraulic diagram is sufficient for one skilled in the art to understand how the drive circuits for providing hydraulic fluid to these cylinders and motors is accomplished and further discussion thereof is not deemed to be warranted.

SUMMARY OF THE OPERATION

With reference to the above FIGURES, once a plurality of rails 34 have been supplied or placed on feed table 12, the vibrators 24 will be started together with the main motor to supply the necessary hydraulic pressures in the hydraulic circuit and the programmable controller, preferably a Westinghouse PC 1100 Programmable Controller is actuated. Attached hereto is a Numa Logic Ladder printout relative to the above-identified programmable controller which sets forth the sequence of operation and conditions necessary to be fulfilled in order to initiate the various processing steps.

Once the vibrator and main motor have been started, rails 34 will be moved down the inclined slides until they abut stop 36. Assuming that neither the first nor second photoelectric switch sees any rails, the feed and lift cylinders will be actuated to move one rail onto the infeed conveyor 14. As the first rail has been placed on the infeed conveyor is moved past the first two photoswitches, PES 1 and PES 2, movement will continue until the front end of that rail is sensed by photoswitch PES 3. At that point, a timer is energized to stop the conveyor drive system with the front end of the rail in the area of the knife edge.

Once the vibrator and main motor have been started, rails 34 will be moved down the inclined slides until they abut stop 36. Assuming that neither the first nor second photoelectric switch sees any rails, the feed and lift cylinders will be actuated to move one rail onto the infeed conveyor 14. As the first rail has been placed on the infeed conveyor is moved past the first two photoswitches, PES 1 and PES 2, movement will continue until the front end of that rail is sensed by photoswitch PES 3. At that point, a timer is energized to stop the conveyor drive system with the front end of the rail in the area of the knife edge.

At this point, clamp assembly 140 can be moved forward, its position being sensed by pressure switch PSCF, to position the rail against jaw 192 and to properly position it under feed wheel 254. When it subsequently retracts to its rear position, limit switch LSCB will be actuated and indicate that position has been reached.

Feed wheel 254 will then be moved downwardly by cylinder 240 until it contacts the top of rail 34. At this point, until photoswitch PES 4 senses the front end of the rail, feed wheel 254 will advance the rail through the area between jaws 192 and 194. Upon photoswitch PES 4 sensing the front of the rail at the desired position, feed wheel 254 will be stopped. Substantially simultaneously with this, clamp mechanism 140 will again move forward, effectively clamping the rail as shown in FIG. 11 until about 800 psi within cylinder 160 is reached. Similarly, the shear cylinder 178 and breaker cylinders 200 are actuated to respectively move shear head 182 and breaker member 208. Pressure continues to build in the shear head 182 and the shear in the breaker member 208 until shearing of the flange has occurred and fracture of the rail has occurred. The pressure switch PSB will be made at failure and the signal from pressure switch PSB then energizes the clamp cylinder retract for the time as set on a timer CRBT in the programmable controller. Thereafter, when time is set on CRBT times out, solenoid "CB" is de-energized and solenoids "S" and "BB" are energized causing the retracting of shear cylinder 178 until the shear head 182 is fully rotated back to its start position at which time pressure switch PSSB is activated.

When PSSB is activated indicating that shear head 182 is back, solenoid "S" will be de-energized thus allowing the breaker cylinder 200 to retract so that the slide 210 will move backward and its fully retracted position, will activate limit switch LSBB. Activation of LSBB will activate solenoid "BB" which will then be de-energized and feed wheel motor 252 will then be energized to feed another rail portion until the front of that new rail portion has been again sensed by photoswitch PES 4.

The steps regarding the clamping and shearing/breaking procedures will be repeated until the rear end of the rail being processed, is sensed by photoelectric switch PES 1, at which time a second rail will be moved onto the conveyor by the tilt and lift mechanism. At this point in time, the conveyor drive will not yet be energized.

When the end of the first rail is sensed by photoswitch PES 2, the conveyor motor 84 and the electric clutch 104 will be activated in order to feed the second rail. If the first rail being handled has not yet cleared photoelectric switch PES 3 by the time the second rail has energized photoelectric switch PES 2, then the conveyor drive will be de-energized until the first rail has cleared photoelectric switch PES 3. When that has occurred, cylinder 240 will be deactivated raising feed wheel 254 and the clamp and breaker head assemblies will be fully retracted. At this time, the procedure will be repeated as when the first rail entered the advancing area beneath feed wheel 254.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What I claim is:

1. Shearing apparatus for cutting railroad track rails into predetermined lengths including feed means for sequentially feeding rails, said feed means includes an inclined feed table comprised of a frame member supporting a plurality of support arms on which a supply of rails can be supported, vibrator means to vibrate a predetermined number of said plurality of support arms and rail feed means for feeding individual rails sequentially, wherein said rail feed means includes a stop member extending along the length of the frame member, a plurality of rail lifting means for lifting an individual rail upwardly from the plane established by the supporting surface of the support arms, each of said rail lifting means being positioned adjacent the lowermost part of one of said plurality of support arms or wherein said rail lifting means has an inclined upper surface that has a steeper incline than the incline of said feed table, advancing means for advancing the fed rails to predetermined positions, clamping means for clamping the fed rails when advanced a desired amount so as to expose one side of the bottom flange of the rail, shear means positioned directly adjacent said clamping means for shearing less than one half of the bottom flange of said rail thereby defining a shear plane, breaker means mounted downstream for said clamp means and said shear plane for breaking the rail adjacent said clamp means at the point where said bottom flange was sheared, control means for automatically controlling the operation of said apparatus, and sensing means for continuously sensing the position of a rail together with the position of said clamping shearing and breaking means for generating signals corresponding to the sensed conditions, whereby said control means receives the signals generated by said sensing means and controls the operation of said shearing apparatus in response thereto.

2. The shearing apparatus as in claim 1 further including an inclined extension member for supporting and guiding a rail between said rail lifting means and said advancing means.

3. The shearing apparatus as in claim 1, wherein said advancing means includes first and second portions and drive means for said first and second portions that permit joint or separate operation thereof.

4. The shearing apparatus as in claim 3, wherein said advancing means further includes rail feed means positioned adjacent said clamp means for feeding the rail in incremental amounts so that a predetermined length of rail extends beyond said clamping means.

5. The shearing apparatus as in claim 1, wherein said clamping means is comprised of a pair of jaws, one of said pair being fixed the other being movable toward and away from said fixed jaw and means for moving said movable jaw.

6. The shearing apparatus as in claim 9, wherein each of said jaws includes a clamping element having a clamping edge defined, in part, by one planar surface angled away from said edge so that an angled entrance surface is defined thereby to direct incoming rails into said clamping means.

7. An automatic railroad rail breaking system for breaking relatively long rails having ball, web and bottom flange portions into shorter segments comprising means for automatically sequentially feeding individual, relatively long rails from a supply thereof, said automatic feeding means including means for holding a supply of a plurality of rails and removal means for removing individual rails from said supply means, comprising means for positioning rails on said supply means, rail lift means located adjacent said positioning means for lifting a single rail from said supply means, conveyor means for conveying rails to said receiving means and rail transfer means for transferring the single lifted rail from said supply means to said conveyor means wherein said rail lift means includes a vertically movable lift member positioned to engage the bottom of a rail and drive means for moving said lift member between raised and lowered positions wherein said supply means is inclined at a predetermined angle toward said converyor means and said lift member has an upper surface inclined in the same direction as said holding means but at a steeper angle so that as said rail is lifted, it will tilt an additional amount from its position on said supply means supply means, for receiving and incrementally feeding the fed rail, means for clamping said rail at a predetermined position thereby defining a rail segment and a shear plane so that predetermined lengths can be broken off said rail along said shear plane, means for applying a bending moment to one side of said rail and means for shearing not more than one half of said bottom flange substantially alone said shear plane on said one side of said rail so that the rail will fail substantially along said shear lane in combined bending and shear and control means or automatically controlling the operation of said rail breaking system.

8. A railroad rail breaking system as in claim 7, wherein said holding means comprises an inclined feed table including an outer frame, support means for supporting said outer frame and rail support beams secured to said outer frame.

9. A railroad rail breaking system as in claim 8, wherein sa predetermined number of said rail support beams are mounted so that they are vibratable and said holding means further includes means for vibrating said vibratable rail support beams.

10. A railroad rail breaking system as in claim 9, wherein the mounting for said vibratable rail support beams includes air cushion pads to isolate the vibrations from said inclined feed table.

11. A railroad rail breaking system as in claim 7, wherein the upper surface of said lifting member has a width that is less than the width of the base of the narrowest rail to be processed.

12. A railroad rail system as in claim 7, wherein said positioning means includes an upper surface inclined at the same angle as the upper surface of said lift member and wherein said transfer means includes a first fixed portion attached to said supply means and having an upper surface inclined at the same angle as the upper surface of said lift member and a second portion attached to said conveyor and movable between raised and lowered positions, said second portion having an upper surface that is aligned with the upper surface of said first portion when in its raised position and retracted within said conveyor means away from the rails when in its lowered position, and means for moving said second portion between its raised and lowered positions.

13. A railroad rail breaking system as in claim 12, wherein said conveyor means includes a plurality of drive and idler rollers, said idler rollers have a diameter less than the diameter of said drive rollers.

14. A railroad rail breaking system as in claim 13, wherein said conveyor means includes front and rear sections and means to operate said front and rear sections in tandem on said rear system independently of said front section.

15. A railroad rail system as in claim 7, wherein said receiving means includes feed wheel means for incrementally feeding the rail to said clamping means, said feed wheel means being movable between a raised position where the rail is not engaged and a lowered position for engaging the ball portion of the rail and means for driving said feed wheel means.

16. A railroad rail system as in claim 7, wherein said clamping means includes a pair of jaw members at least one of which is movable means for moving said at least one movable jaw toward and away from the other, each of said jaw members having a rail engaging clamping edge that is angled to engage both said ball and flange portions and a surface facing said receiving means that angles obliquely away from said clamping edge and means for moving said at least one movable jaw toward and away from said fixed jaw.

17. A railroad rail breaking system as in claim 16, wherein said jaw members include removable clamping edges.

18. A railroad rail breaking system as in claim 7, wherein said shear means includes a frame movable toward and away from said rail, a lower shear knife fixed to said frame so that said lower knife is movable beneath part of said bottom flange directly adjacent at least the clamping edge in said at least one movable jaw, an upper shear knife pivotally mounted to said frame so that it can move toward and away from said rail in unison with said lower knife to be positioned above a similar portion of said bottom flange, means to pivot said upper knife so that the portion of the bottom flange positioned between the upper and lower knives will be sheared and means to move said frame toward and away from said rail.

19. A railroad rail breaking system as in claim 18, wherein said clamping and shearing means move in tandem toward and away from said rail.

20. A railroad rail breaking system as in claim 7, wherein said bending moment means includes a ram member for engaging the side of said rail and drive means connected to said ram member for driving said ram member.

* * * * *